(12) United States Patent
Fang et al.

(10) Patent No.: US 12,608,392 B2
(45) Date of Patent: Apr. 21, 2026

(54) UNIFYING RUNTIME CATALOG AND METASTORE FOR A CLOUD STORAGE SYSTEM

(71) Applicant: Google LLC, Mountain View, CA (US)

(72) Inventors: Zhou Fang, Santa Clara, CA (US); Thibaud Hottelier, Seattle, WA (US); Anoop Kochummen Johnson, Fremont, CA (US); Micah Kornfield, Seattle, WA (US); Justin Levandoski, Seattle, WA (US); Yuri Volobuev, Walnut Creek, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/201,243

(22) Filed: May 24, 2023

(65) Prior Publication Data

US 2024/0394273 A1 Nov. 28, 2024

(51) Int. Cl.
*G06F 16/00* (2019.01)
*G06F 16/22* (2019.01)
*G06F 16/25* (2019.01)

(52) U.S. Cl.
CPC ........ *G06F 16/254* (2019.01); *G06F 16/2282* (2019.01); *G06F 16/258* (2019.01)

(58) Field of Classification Search
CPC ... G06F 16/254; G06F 16/2282; G06F 16/258
USPC ......................................................... 707/602
See application file for complete search history.

(56) References Cited

U.S. PATENT DOCUMENTS

| | | | | |
|---|---|---|---|---|
| 2021/0056118 | A1* | 2/2021 | Mitra | G06F 9/548 |
| 2022/0075889 | A1* | 3/2022 | Friedman | G06F 21/6218 |
| 2022/0237202 | A1* | 7/2022 | Orun | G06F 16/254 |
| 2022/0327119 | A1* | 10/2022 | Gasper | G06F 16/9024 |
| 2023/0144349 | A1* | 5/2023 | Kodavati | G06F 16/27 |
| | | | | 707/602 |
| 2023/0401193 | A1* | 12/2023 | Aya | G06F 16/258 |
| 2024/0086184 | A1* | 3/2024 | Wang | G06N 20/20 |

(Continued)

FOREIGN PATENT DOCUMENTS

| | | |
|---|---|---|
| CN | 115408370 A | 11/2022 |
| EP | 3657351 A1 | 5/2020 |
| WO | 2023079484 A1 | 5/2023 |

OTHER PUBLICATIONS

Edara et al. Big Metadata: When Metadata is Big Data. Jul. 1, 2021. Proceedings of the VLDB Endowment, vol. 14, No. 12, pp. 3083-3095.

(Continued)

*Primary Examiner* — Raquel Perez-Arroyo
(74) *Attorney, Agent, or Firm* — Lerner David LLP

(57) ABSTRACT

Aspects of the disclosure are directed to a runtime catalog for a cloud storage engine that unifies data lakes and data warehouses. The runtime catalog can expose a single universe of cloud storage tables through an endpoint for query engines for data lakes and another endpoint for query engines for data warehouses. The runtime catalog can allow the query engines for data lakes and the query engines for data warehouses to query any cloud storage table by representing data warehouse native tables in a format compatible with data lakes and representing data lake native tables in a format compatible with data warehouses.

20 Claims, 6 Drawing Sheets

(56) References Cited

U.S. PATENT DOCUMENTS

2024/0289041 A1 * 8/2024 Acharya Chandrashekar .............
G06F 3/0604

OTHER PUBLICATIONS

International Search Report and Written Opinion for International Application No. PCT/US2024/028478 dated Jul. 16, 2024. 13 pages.

* cited by examiner

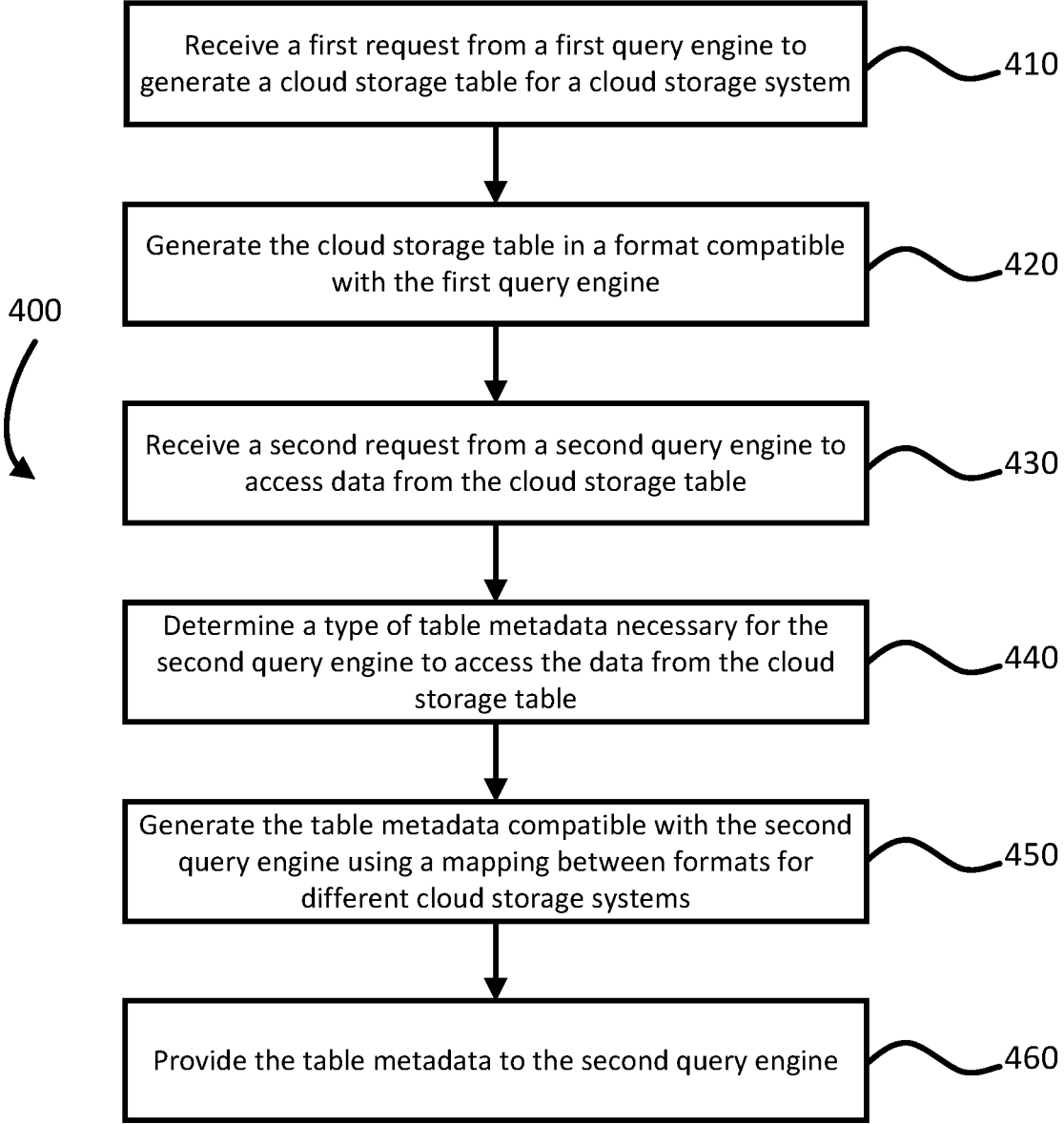

400

Receive a first request from a first query engine to generate a cloud storage table for a cloud storage system — 410

Generate the cloud storage table in a format compatible with the first query engine — 420

Receive a second request from a second query engine to access data from the cloud storage table — 430

Determine a type of table metadata necessary for the second query engine to access the data from the cloud storage table — 440

Generate the table metadata compatible with the second query engine using a mapping between formats for different cloud storage systems — 450

Provide the table metadata to the second query engine — 460

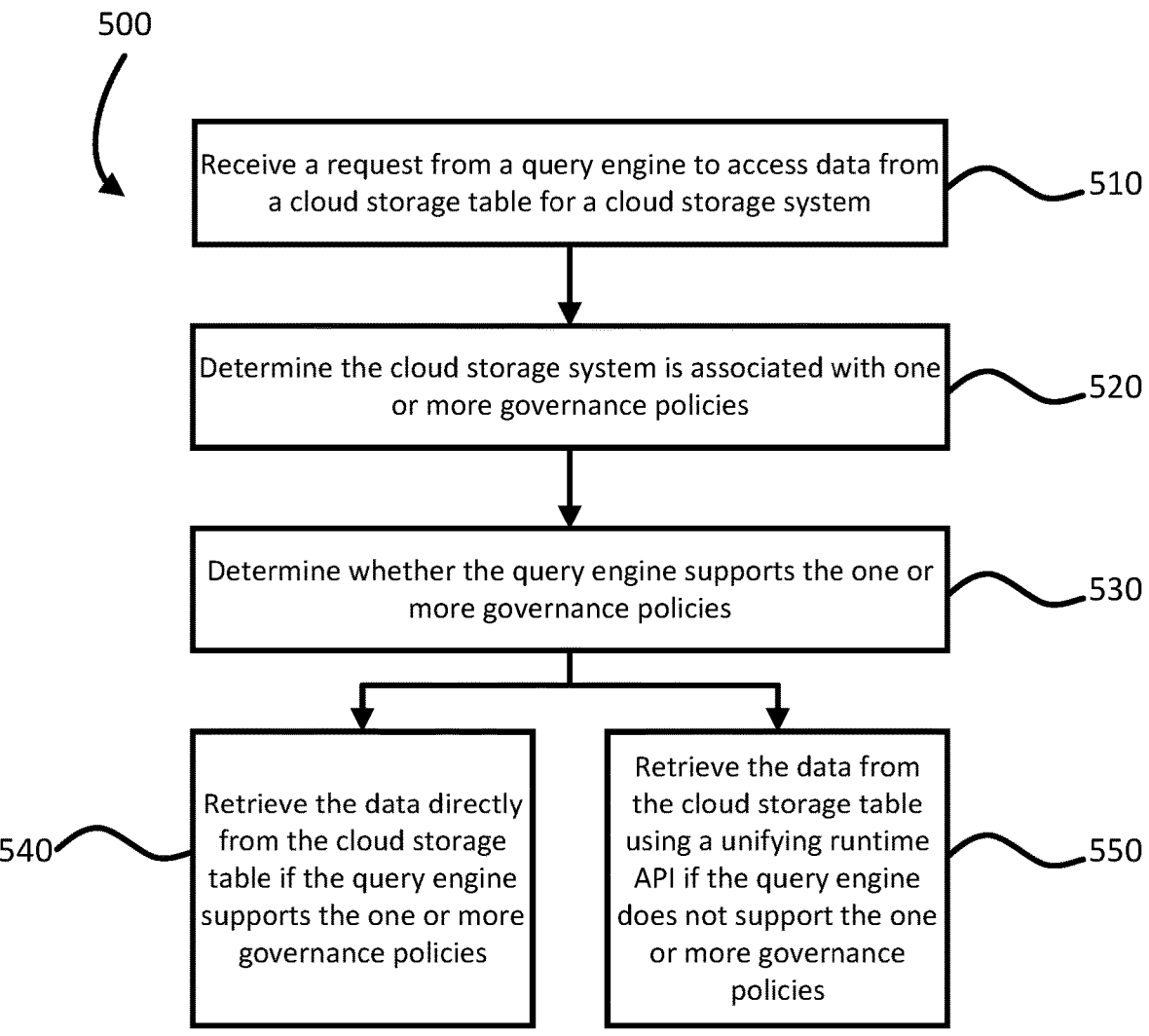

Receive a request from a query engine to access data from a cloud storage table for a cloud storage system — 510

Determine the cloud storage system is associated with one or more governance policies — 520

Determine whether the query engine supports the one or more governance policies — 530

540 — Retrieve the data directly from the cloud storage table if the query engine supports the one or more governance policies Retrieve the data from the cloud storage table using a unifying runtime API if the query engine does not support the one or more governance policies — 550

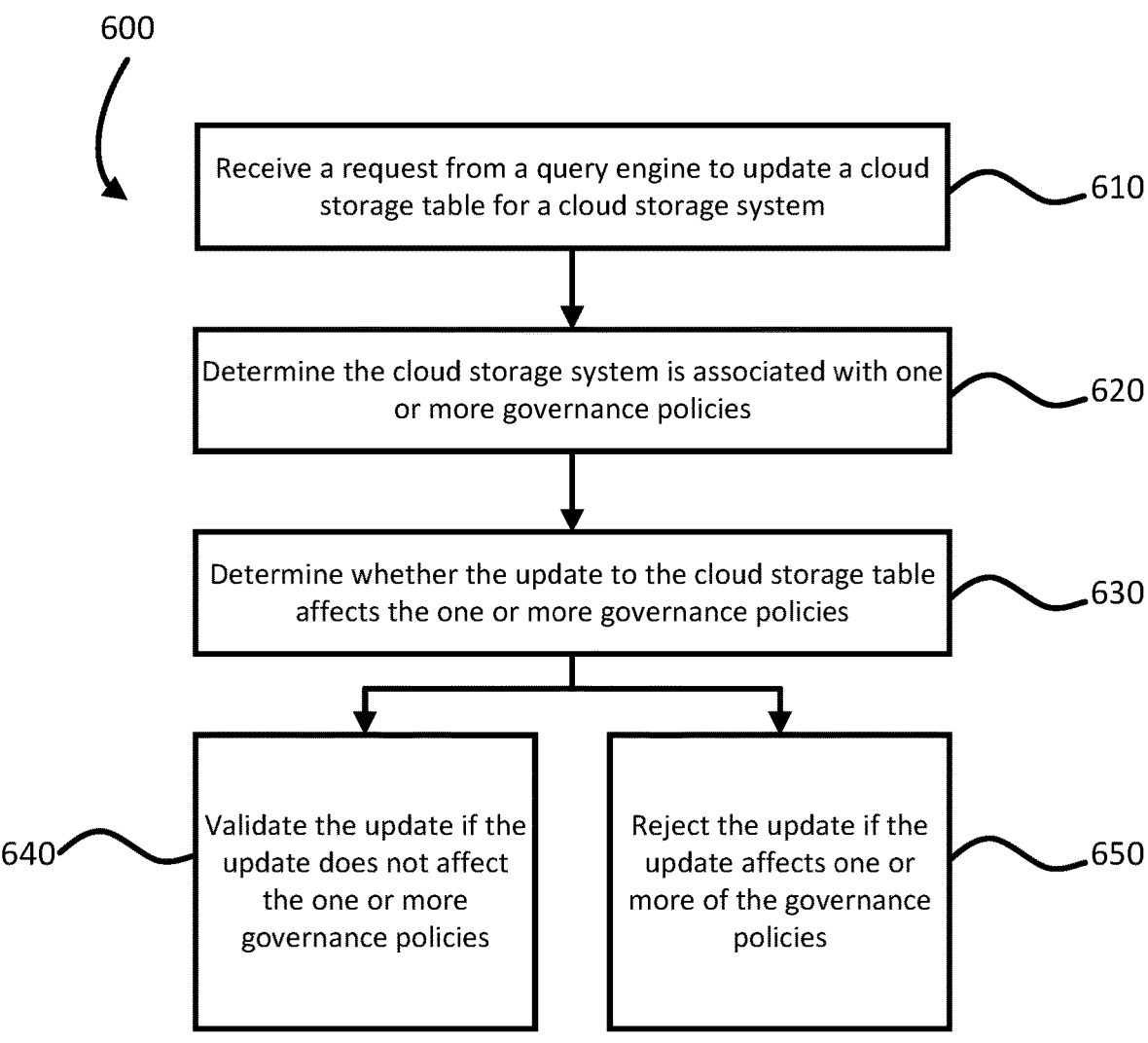

Receive a request from a query engine to update a cloud storage table for a cloud storage system — 610

Determine the cloud storage system is associated with one or more governance policies — 620

Determine whether the update to the cloud storage table affects the one or more governance policies — 630

640 — Validate the update if the update does not affect the one or more governance policies Reject the update if the update affects one or more of the governance policies — 650

FIG. 6

UNIFYING RUNTIME CATALOG AND METASTORE FOR A CLOUD STORAGE SYSTEM

BACKGROUND

A runtime catalog can correspond to an inventory of cloud storage tables for a data warehouse or a data lake. The runtime catalog can include one or more attributes describing the cloud storage tables that query engines for the data lakes or data warehouses use to execute queries. The query engines for the data lakes or data warehouses can have their own runtime catalog, which cannot be used by other query engines. This can cause data silos and difficulties with synchronizing each runtime catalog, as each runtime catalog is independently updated.

BRIEF SUMMARY

Aspects of the disclosure are directed to a runtime catalog for a cloud storage engine that unifies data lakes and data warehouses. The runtime catalog can expose a single universe of cloud storage tables through an endpoint for query engines for data lakes and another endpoint for query engines for data warehouses. The runtime catalog can contain a bi-directional translation layer to allow the query engines for data lakes and the query engines for data warehouses to query any cloud storage table, regardless of whether a format for the cloud storage table is compatible with data lakes or data warehouses. The translation layer can represent data warehouse native tables in a format compatible with data lakes and can represent data lake native tables in a format compatible with data warehouses.

An aspect of the disclosure provides for a method for processing queries, including: receiving, by one or more processors, a request from a query engine to access data from a cloud storage table residing in a cloud storage system; determining, by the one or more processors, a type of table metadata necessary for the query engine to access the data from the cloud storage table; generating, by the one or more processors, the table metadata compatible with the query engine using a mapping between formats for different cloud storage systems; and providing, by the one or more processors, the table metadata to the query engine.

In an example, the method further includes: receiving, by the one or more processors, a request from a second query engine to generate the cloud storage table; and generating, by the one or more processors, the cloud storage table in a format compatible with the second query engine; where the query engine and the second query engine have incompatible formats. In another example, determining the type of table metadata further includes identifying a format of the query engine, where the query engine is formatted for a data lake and the cloud storage table is formatted for a data warehouse or the query engine is formatted for a data warehouse and the cloud storage table is formatted for a data lake. In yet another example, the mapping includes a mapping of compatible features between a format for the query engine and a format for the cloud storage table.

In yet another example, the method further includes determining, by the one or more processors, that the cloud storage system is associated with one or more governance policies. In yet another example, the method further includes: determining, by the one or more processors, the query engine supports the one or more governance policies; and retrieving, by the one or more processors, the data directly from the cloud storage table. In yet another example, the method further includes: determining, by the one or more processors, the query engine does not support the one or more governance policies; and retrieving, by the one or more processors, the data from the cloud storage table through a unifying runtime application programming interface (API). In yet another example, the method further includes: determining, by the one or more processors, an update to the cloud storage table does not affect the one or more governance policies; and validating, by the one or more processors, the update to the cloud storage table. In yet another example, the method further includes: determining, by the one or more processors, an update to the cloud storage table affects the one or more governance policies; and rejecting, by the one or more processors, the update to the cloud storage table.

In yet another example, the method further includes storing, by the one or more processors, file-level metadata in a metadata management system. In yet another example, the method further includes storing, by the one or more processors, lineage for the data from the cloud storage table. In yet another example, the method further includes supporting, by the one or more processors, unstructured data assets through object tables.

Another aspect of the disclosure provides for a system including: one or more processors; and one or more storage devices coupled to the one or more processors and storing instructions that, when executed by the one or more processors, cause the one or more processors to perform operations for processing queries, the operations including: receiving a request from a query engine to access data from a cloud storage table residing in a cloud storage system; determining a type of table metadata necessary for the query engine to access the data from the cloud storage table; generating the table metadata compatible with the query engine using a mapping between formats for different cloud storage systems; and providing the table metadata to the query engine.

In an example, the operations further include: receiving a request from a second query engine to generate the cloud storage table; and generating the cloud storage table in a format compatible with the second query engine; where the query engine and the second query engine have incompatible formats. In another example, determining the type of table metadata further includes identifying a format of the query engine, where the query engine is formatted for a data lake and the cloud storage table is formatted for a data warehouse or the query engine is formatted for a data warehouse and the cloud storage table is formatted for a data lake. In yet another example, the mapping includes a mapping of compatible features between a format for the query engine and a format for the cloud storage table.

In yet another example, the operations further include determining that the cloud storage system is associated with one or more governance policies. In yet another example, the operations further include: determining the query engine supports the one or more governance policies and retrieving the data directly from the cloud storage table; or determining the query engine does not support the one or more governance policies and retrieving the data from the cloud storage table through a unifying runtime application programming interface (API). In yet another example, the operations further include: determining an update to the cloud storage table does not affect the one or more governance policies and validating the update to the cloud storage table; or determining an update to the cloud storage table affects the one or more governance policies and rejecting the update to the cloud storage table.

Yet another aspect of the disclosure provides for a non-transitory computer readable medium for storing instructions that, when executed by one or more processors, cause the one or more processors to perform operations for processing queries, the operations including: receiving a request from a query engine to access data from a cloud storage table residing in a cloud storage system; determining a type of table metadata necessary for the query engine to access the data from the cloud storage table; generating the table metadata compatible with the query engine using a mapping between formats for different cloud storage systems; and providing the table metadata to the query engine.

BRIEF DESCRIPTION OF THE DRAWINGS

FIG. 4 depicts a flow diagram of an example process for processing queries according to aspects of the disclosure.

FIG. 5 depicts a flow diagram of an example process for directing query processing when associated with governance policies according to aspects of the disclosure.

FIG. 6 depicts a flow diagram of an example process for managing updates to cloud storage tables when associated with governance policies according to aspects of the disclosure.

DETAILED DESCRIPTION

Figure 1:
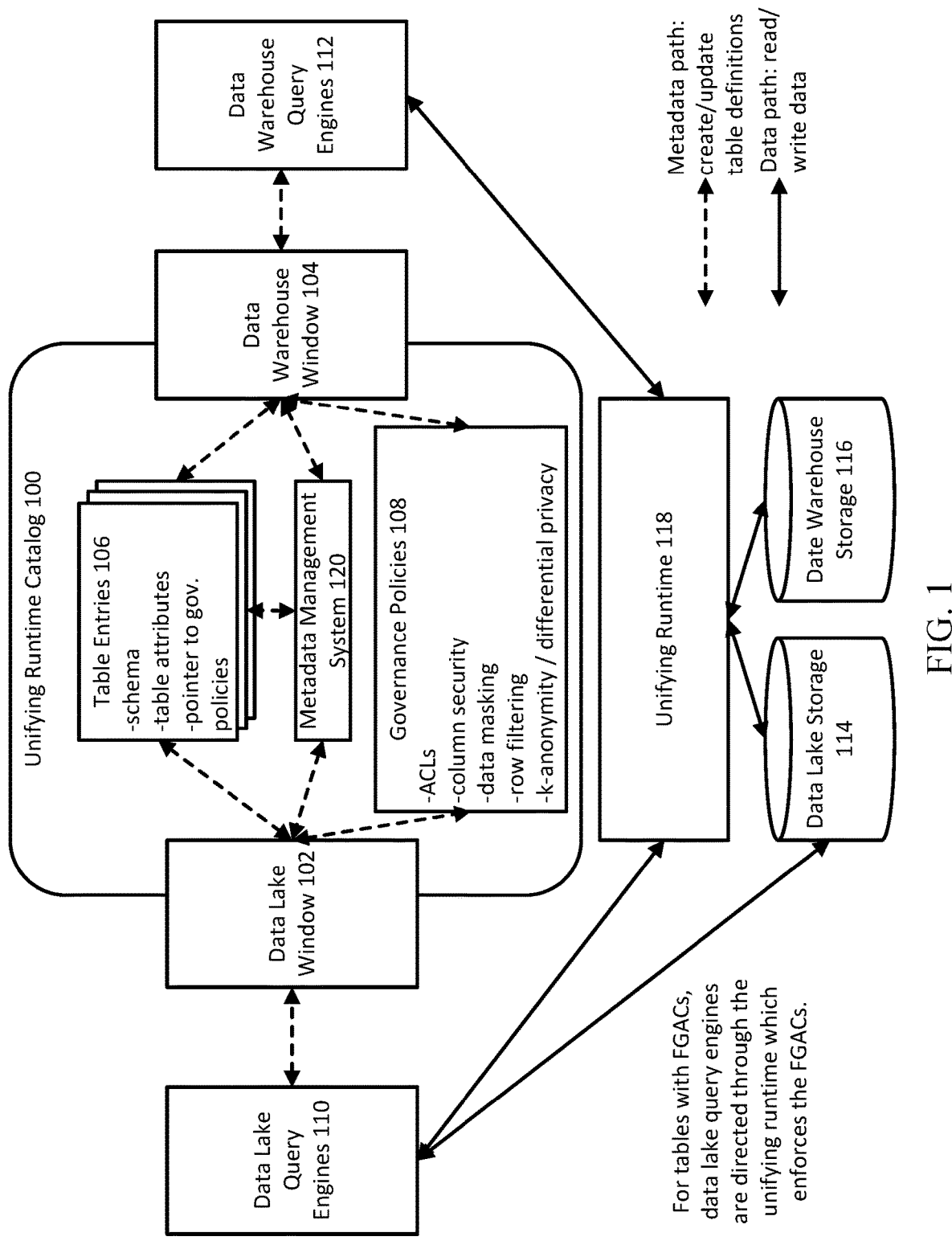
FIG. 1 depicts a block diagram of an example unifying runtime catalog for a cloud storage system that unifies data lakes and data warehouses according to aspects of the disclosure.

The technology relates generally to a runtime catalog for a cloud storage engine that unifies data lakes and data warehouses. The runtime catalog can expose a single universe of tables through an endpoint for query engines for data lakes and another endpoint for query engines for data warehouses.

A runtime catalog can correspond to an inventory of cloud storage tables containing their attributes, such as name, schema, access control lists (ACLs), partitioning and clustering schemes, references to storage containing the cloud storage tables, and/or other runtime metadata/configurations. Query engines for data lakes and data warehouses can use the attributes of the tables in the runtime catalog to execute queries. Data warehouses can have their own embedded runtime catalog while data lakes can have a standardized runtime catalog to which various open-source engines can connect.

Query engines for data lakes and data warehouses typically have their own runtime catalog, which cannot be used by other query engines, creating data silos. Keeping the runtime catalogs in sync can be difficult because the tools or engines operating on the catalogs can only update their own catalog. When runtime catalogs diverge, a number of problems can occur. For example, table attributes can be missing, duplicated, and/or out of date, making finding data difficult. Further, if table attributes are duplicated, enforcing a particular security policy on one table may still leave another table inadvertently exposed. As another example, a preferred query engine may not work with the runtime catalog in which the table is defined. As yet another example, advanced catalog features cannot be used as standardization occurs on the least common denominator of the runtime catalogs. If two catalogs support incompatible types of fine-grained access controls (FGAC), the FGAC cannot be used.

A unifying runtime catalog for data lakes and data warehouses can address these problems. The unifying runtime catalog can support a variety of table formats, including warehouse native tables as well as open-source formats. For example, the unifying runtime catalog can support tabular tables as well as semi-structured and/or unstructured data through object tables. Since data lakes and data warehouses have incompatible representations of tables and their attributes, the unifying runtime catalog contains a bi-directional translation layer to allow the query engines to query each other's tables.

The translation layer can represent data warehouse native tables in a format compatible with data lakes and can represent data lake native tables in a format compatible with data warehouses. The translation layer can use a mapping of compatible features of the runtime catalogs for the data lakes and data warehouses. The translation layer can represent table attributes between data lake compatible formats and data warehouse compatible formats using the mapping. As examples of compatible features, the translation layer can represent schema, advanced data types, column identifiers, special characters in column or table names, table attributes controlling data layout, collation rules to control how data is sorted, ACLs, and/or FGACs. Since open source query engines can have varying support for FGACs, the translation layer can also redirect open source query engines through a data lake runtime API when necessary to provide support for the FGACs.

The unifying runtime catalog can create, list, and/or manage databases, tables, and their attributes through both the data lake endpoints and data warehouse endpoints and through data definition language (DDL) received from the query engines for the data lakes or data warehouses. The unifying runtime catalog can further return table definitions with metadata to the query engines for the data lakes or data warehouses to process queries. The table definitions allow the query engines to read and write to tables.

For example, the unifying runtime catalog can receive a request from a first query engine to create a table. The unifying runtime catalog can generate the table in a format compatible with the first query engine. The unifying runtime catalog can receive a request from a second query engine to access data from the table. The unifying runtime catalog can determine that the request is from the second query engine, which can be incompatible with the format of the table. For example, the first query engine can be for a data lake while the second query engine can be for a data warehouse or the first query engine can be for a data warehouse while the second query engine can be for a data lake. The translation layer of the unifying runtime catalog can use a mapping to represent the data in the format compatible with the second query engine. The unifying runtime catalog can return the data to the second query engine so that the second query engine can process the query.

For table definitions that are expensive to generate due to requiring filtering through millions of files to return those pertinent to a query, the unifying runtime catalog can accelerate these operations using a metadata management system to store file-level metadata either as a cache or as a primary source-of-truth. The metadata management system can include data about table states for preliminarily pruning files as well as table and column statistics that enabled the query engines to make better decisions for processing queries, such as using broadcast join or using table schemas to perform dynamic predicate pruning.

For some table formats, the unifying runtime catalog can also return alternative table definitions, representing a different way to read data. For example, some query engines can read tables by fetching data files directly from the data lake or read the same tables through a data lake runtime API. Using the data lake runtime API can enable FGACs for query engines that do not support them. The unifying runtime catalog can select a table definition based on whether the table has FGACs set up and whether the query engine supports the FGACs. The unifying runtime catalog can guarantee uniform enforcement of the FGACs regardless of whether queries are processed on the data warehouse side or data lake side.

The unifying runtime catalog can further create and/or manage ACLs and FGACs. Example ACLs and/or FGACs can include column security, data masking, and/or row filtering. The unifying runtime catalog can ensure that query engines do not commit changes that could impact ACLs and/or FGACs. For example, a query engine for a data lake that is not aware of a row access policy could try to rename a column referred to in the row access policy. Doing so would break the policy and inadvertently expose data. The unifying runtime catalog can validate all table updates and reject updates that affect ACLs and/or FGACs.

The unifying runtime catalog can also store a universal data lineage for data lakes and data warehouses. The unifying runtime catalog can provide ancestors and derived results for any table, regardless of which query engine executed the operation.

The unifying runtime catalog can support unstructured data assets through object tables. Object tables can correspond to a structured query language (SQL) interface to object store metadata. Object tables can include a list of objects with name, size, hash, etc. Object tables can allow a file with arbitrary content to be represented in SQL.

FIG. 1 depicts a block diagram of an example unifying runtime catalog 100 for a cloud storage system that unifies data lakes and data warehouses. The unifying runtime catalog 100 can include a data lake window 102 and a data warehouse window 104 to expose table entries 106 and governance policies 108 respectively to data lake query engines 110 and data warehouse query engines 112. Example data lake query engines 110 can include open-source engines. Example data warehouse query engines 112 can include warehouse native APIs.

The cloud storage system can include data lake storage 114 and data warehouse storage 116. The data lake storage 114, such as an object store, can correspond to a repository containing raw, unstructured data while the data warehouse storage 116 can correspond to a repository containing structured data. Based on metadata from the table entries 106 and/or governance policies 108, the data lake query engines 110 can access data directly from the data lake storage 114 or can access data from either the data lake storage 114 or the data warehouse storage 116 through a unifying runtime 118. Similarly, based on metadata from the tables entries 106 and/or governance policies 108, the data warehouse query engines 112 can access data from the data lake storage 114 or the data warehouse storage 116 through a unifying runtime 118. The unifying runtime 118 can present a unified API for the query engines 112 to read data, regardless of whether the data is stored in the data lake storage 114 or data warehouse storage 116. The unifying runtime 118 can abstract away whether the data files are stored in the data lake storage 114 or the data warehouse storage 116. The unifying runtime 118 can also enforce FGACs. The unifying runtime 118 can further accelerate query processing by using a metadata cache to prune data files and reduce the amount of data processed by the query engines 112.

The unifying runtime catalog 100 can correspond to an inventory of cloud storage tables of the data lake storage 114 and the data warehouse storage 116. The unifying runtime catalog 100 can include the table entries 106 and/or the governance policies 108. The table entries 106 can correspond to metadata and/or configurations for the cloud storage tables. Example table entries 106 can include schema like partitioning and clustering schema, table attributes like names or other identifiers, or pointers to governance policies likes ACLs. The table entries 106 can further include a universal data lineage for providing ancestors or derived results for a cloud storage table, regardless of whether executed by the data lake query engines 110 or the data warehouse query engines 112. The governance policies 108 can correspond to data security for accessing the cloud storage tables. Example governance policies 108 can include ACLs, column security, data masking, row filtering, k-anonymity, or differential privacy. The data lake query engines 110 and data warehouse query engines 112 can access metadata of the table entries 106 and/or governance policies 108 to execute queries.

The unifying runtime catalog 100 can include a metadata management system 120 to store file-level metadata for accelerating the generation of table metadata to provide to the data lake query engines 110 or the data warehouse query engines 112. For example, generating some table definitions can be computationally expensive, requiring extensive processing power to filter through millions of files to return the metadata pertinent to a query. For example, generating metadata for queries associated with Hive-partitioned tables can be computationally expensive. The metadata management system 120 can store file-level metadata as a cache or a primary source of truth to preliminarily prune metadata so the unifying runtime catalog does not have to search through as many files. Further, the metadata management system 120 can store file-level metadata to enable query engines to improve query processing. For example, the metadata management system 120 can allow the query engines to use broadcast join or table schemas for performing dynamic predicate pruning.

The unifying runtime catalog 100 can avoid difficulties that occur when maintaining separate runtime catalogs for data lakes and data warehouses. For example, the unifying runtime catalog 100 can make finding data easier, since table entries 106 can be consistent for data lake query engines 110 and data warehouse query engines 112. The unifying runtime catalog 100 can avoid missing, duplicated, and/or out-of-date table entries that can occur with separate runtime catalogs that have diverged. As another example, the unifying runtime catalog 100 can make sharing data easier, as users with different engines can share the same table definition and the same ACLs without involving a cumbersome and error-prone export/load cycle into engine-specific catalogs. As yet another example, the unifying runtime catalog 100 can improve security through universal governance policies 106 for data lake query engines 110 and data warehouse query engines 112. The unifying runtime catalog 100 can avoid least common denominator security standardization that can occur with separate runtime catalogs, where some governance policies cannot be used if two runtime catalog support incompatible types of the governance policies. The unifying runtime catalog 100 can also avoid inadvertently exposing data by enforcing a governance policy on one duplicated cloud storage table but not the other.

Figure 2:
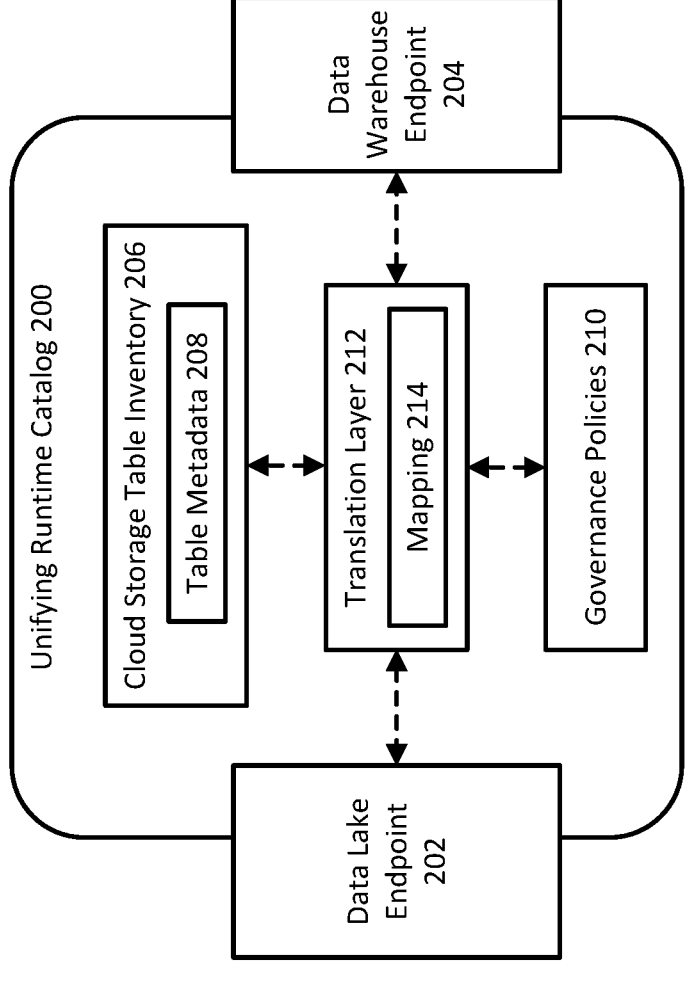
FIG. 2 depicts a block diagram of an example unifying runtime catalog according to aspects of the disclosure.

FIG. 2 depicts a block diagram of an example unifying runtime catalog 200. The unifying runtime catalog 200 can correspond to the unifying runtime catalog 100 as depicted in FIG. 1. The unifying runtime catalog 200 can include a data lake endpoint 202 and a data warehouse endpoint 204 for respectively interfacing with data lake query engines and data warehouse query engines. The data lake endpoint 202 and data warehouse endpoint 204 can correspond to APIs or any other interface to expose metadata to the data lake query engines and data warehouse query engines.

The unifying runtime catalog 200 can include a cloud storage table inventory 206 with table metadata 208 in any table format, including data warehouse native table formats and data lake native table formats. For example, the unifying runtime catalog 200 can support tabular tables as well as semi-structured or unstructured data through object tables. Example semi-structured or unstructured data can include images, videos, documents, and/or any files with non-tabular content. Object tables can correspond to a structured query language (SQL) interface to object store metadata. Object tables can include a list of objects, including their name, size, hash, etc., to allow a file with arbitrary content to be represented in SQL. The unifying runtime catalog 200 can further include one or more governance policies 210 to provide data security.

To account for data lakes and data warehouses having incompatible representations of tables, the unifying runtime catalog 200 includes a bi-directional translation layer 212 to allow the data lake query engines and data warehouse query engines to process queries regardless of table format. The translation layer 212 can represent the cloud storage table inventory 206, including the table metadata 208, and/or the governance policies 210 in formats compatible with either data lakes or data warehouses. For example, the translation layer 212 can represent data warehouse native tables in a format compatible with data lakes and can represent data lake native tables in a format compatible with data warehouses. The translation layer 212 can also redirect data lake query engines that do not have support for FGACs through a unifying runtime, such as a data lake runtime API, to provide support for the FGACs.

The translation layer 212 can include a mapping 214 of compatible features of the unifying runtime catalog 200 for the data lakes and data warehouses. Examples of compatible features include schema, advanced data types, column identifiers, special characters in column or table names, table attributes controlling data layout, ACLs, and/or FGACs. Example advanced data types can include STRUCT, ARRAY, BIGNUMERIC, JSON, and/or GEOGRAPHY. Example table attributes controlling data layout can include partitioning configurations and/or clustering configurations. Example FGACs can include column security, row filtering, data masking, and/or k-anonymity or differential privacy.

Figure 3:
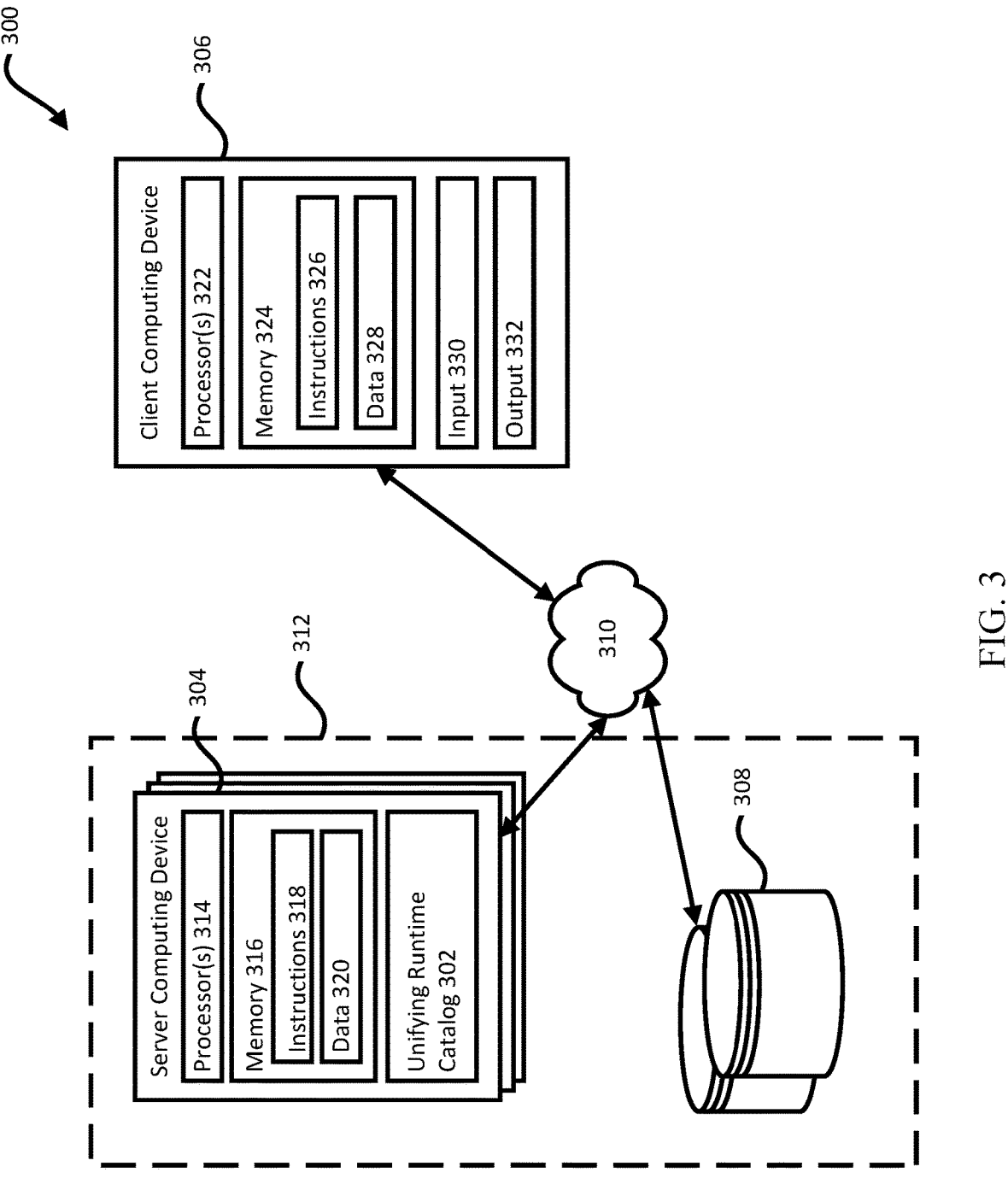
FIG. 3 depicts a block diagram of an example computing environment implementing a unifying runtime catalog for a cloud storage system according to aspects of the disclosure.

FIG. 3 depicts a block diagram of an example computing environment 300 implementing a unifying runtime catalog 302 for a cloud storage system. The unifying runtime catalog 302 can correspond to the unifying runtime catalog 100 as depicted in FIG. 1 or the unifying runtime catalog 200 as depicted in FIG. 2. The unifying runtime catalog 302 can be implemented on one or more devices having one or more processors in one or more locations, such as in a server computing device 304. A client computing device 306 and the server computing device 304 can be communicatively coupled to one or more storage devices 308 over a network

310. The server computing device 304 and the storage devices 308 can form part of a cloud computing system 312 for cloud computing services such as Infrastructure as a Service (IaaS), Platform as a Service (PaaS), and/or Software as a Service (SaaS).

For example, the client computing device 306 may use the cloud computing system 312 as a service that provides software applications, such as accounting, word processing, inventory tracking, fraud detection, file sharing, video sharing, audio sharing, communication, or gaming. As another example, the client computing device 306 can access the cloud computing system 312 as part of one or more operations that employ machine learning, deep learning, and/or artificial intelligence technology to train the software applications. The cloud computing system 312 can provide model parameters that can be used to update machine learning models for the software applications.

The storage devices 308 can be a combination of volatile and non-volatile memory and can be at the same or different physical locations than the computing devices 304, 306. For example, the storage devices 308 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 304 can include one or more processors 314 and memory 316. The memory 316 can store information accessible by the processors 314, including instructions 318 that can be executed by the processors 314. The memory 316 can also include data 320 that can be retrieved, manipulated, or stored by the processors 314. The memory 316 can be a type of non-transitory computer readable medium capable of storing information accessible by the processors 314, such as volatile and non-volatile memory. The processors 314 can include one or more central processing units (CPUs), graphic processing units (GPUs), field-programmable gate arrays (FPGAs), and/or application-specific integrated circuits (ASICs), such as tensor processing units (TPUs).

The instructions 318 can include one or more instructions that when executed by the processors 314, cause the one or more processors to perform actions defined by the instructions 318. The instructions 318 can be stored in object code format for direct processing by the processors 314, or in other formats including interpretable scripts or collections of independent source code modules that are interpreted on demand or compiled in advance. The instructions 318 can include instructions for implementing the unifying runtime catalog 302. The unifying runtime catalog 302 can be executed using the processors 314, and/or using other processors remotely located from the server computing device 304.

The data 320 can be retrieved, stored, or modified by the processors 314 in accordance with the instructions 318. The data 320 can be stored in computer registers, in a relational or non-relational database as a table having a plurality of different fields and records, or as JSON, YAML, proto, or XML documents. The data 320 can also be formatted in a computer-readable format such as, but not limited to, binary values, ASCII, or Unicode. Moreover, the data 320 can include information sufficient to identify relevant information, such as numbers, descriptive text, proprietary codes, pointers, references to data stored in other memories, including other network locations, or information that is used by a function to calculate relevant data.

The client computing device 306 can also be configured similarly to the server computing device 304, with one or more processors 322, memory 324, instructions 326, and data 328. The client computing device 306 can also include a client input 330 and a client output 332. The client input 330 can include any appropriate mechanism or technique for receiving input from a client, such as keyboard, mouse, mechanical actuators, soft actuators, touchscreens, microphones, and sensors.

The server computing device 304 can be configured to transmit data to the client computing device 306, and the client computing device 306 can be configured to display at least a portion of the received data on a display implemented as part of the client output 332. The client output 332 can also be used for displaying an interface between the client computing device 306 and the server computing device 304. The client output 332 can alternatively or additionally include one or more speakers, transducers or other audio outputs, a haptic interface or other tactile feedback that provides non-visual and non-audible information to a client of the client computing device 306.

Although FIG. 3 illustrates the processors 314, 322 and the memories 316, 324 as being within the computing devices 304, 306, components described herein, including the processors 314, 322 and the memories 316, 324 can include multiple processors and memories that can operate in different physical locations and not within the same computing device. For example, some of the instructions 318, 326 and the data 320, 328 can be stored on a removable SD card and other instructions within a read-only computer chip. Some or all of the instructions 31, 326 and data 320, 328 can be stored in a location physically remote from, yet still accessible by, the processors 314, 322. Similarly, the processors 314, 322 can include a collection of processors that can perform concurrent and/or sequential operations. The computing devices 304, 306 can each include one or more internal clocks providing timing information, which can be used for time measurement for operations and programs run by the computing devices 304, 306.

The computing devices 304, 306 can be capable of direct and indirect communication over the network 310. The devices 304, 306 can set up listening sockets that may accept an initiating connection for sending and receiving information. The network 310 itself can include various configurations and protocols including the Internet, World Wide Web, intranets, virtual private networks, wide area networks, local networks, and private networks using communication protocols proprietary to one or more companies. The network 310 can support a variety of short- and long-range connections. The short- and long-range connections may be made over different bandwidths, such as 2.402 GHz to 2.480 GHz, commonly associated with the Bluetooth® standard, 2.4 GHz and 5 GHz, commonly associated with the Wi-Fi® communication protocol; or with a variety of communication standards, such as the LTE® standard for wireless broadband communication. The network 310, in addition or alternatively, can also support wired connections between the computing devices 304, 306, including over various types of Ethernet connection.

Although a single server computing device 304 and user computing device 306 are shown in FIG. 3, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

FIG. 4 depicts a flow diagram of an example process 400 for processing queries. The example process 400 can be performed on a system of one or more processors in one or more locations, such as the example unifying runtime catalog 100 as depicted in FIG. 1. The unifying runtime catalog 100 can create, list, and/or manage the table entries 106 and/or governance policies 108 through the data lake window 102 and the data warehouse window 104. The unifying runtime catalog 100 can receive data definition language (DDL) from the data lake query engines 110 and data warehouse query engines 112. Using the DDL, the unifying runtime catalog 100 can return table definitions with metadata to the data lake query engines 110 and data warehouse query engines 112 to process queries. The table definitions allow the data lake query engines 110 and data warehouse query engines 112 to read and write to tables stored in the data lake storage 114 or data warehouse storage 116.

As shown in block 410, the unifying runtime catalog 100 can receive a first request from a first query engine to generate a cloud storage table for a cloud storage system. The cloud storage table can correspond to a table for either the data lake storage 114 or data warehouse storage 116. The first query engine can correspond to one of the data lake query engines 110 or one of the data warehouse query engines 112.

As shown in block 420, the unifying runtime catalog 100 can generate the cloud storage table in a format compatible with the first query engine. For example, if the first query engine corresponds to one of the data lake query engines 110, the unifying runtime catalog 100 can generate the cloud storage table in a format compatible with data lake query engines 110, such as by storing in the data lake storage 114. Similarly, if the first query engine corresponds to one of the data warehouse query engines 112, the unifying runtime catalog 100 can generate the cloud storage table in a format compatible with data warehouse query engines 112, such as by storing in the data warehouse storage 116.

As shown in block 430, the unifying runtime catalog 100 can receive a second request from a second query engine to access data from the cloud storage table for processing a query. The second query engine can correspond to one of the data warehouse query engines 112 or one of the data lake query engines 110. For example, the second query engine can request table definitions to read the cloud storage table.

As shown in block 440, the unifying runtime catalog 100 can determine a type of table metadata of the table entries 106 necessary for the second query engine to access the data from the cloud storage table. The unifying runtime catalog 100 can identify a format of the second query engine. For example, unifying runtime catalog 100 can determine the second query engine corresponds to a data warehouse query engine 112 or a data lake query engine 110, so the table metadata should be in a format compatible the data warehouse query engines 112 or data lake query engines 110, respectively.

The unifying runtime catalog 100 can further determine the second request is from a query engine incompatible with the format of the cloud storage table. For example, the first query engine can correspond to a data lake query engine 110 while the second query engine can correspond to a data warehouse query engine 112, or the first query engine can correspond to a data warehouse query engine 112 while the second query engine can correspond to a data lake query engine 110.

As shown in block 450, the unifying runtime catalog 100 can generate the table metadata of the table entries 106 as the type compatible with the second query engine. The unifying runtime catalog 100 can include a translation layer that uses a mapping between formats for different cloud storage systems to generate the table metadata. The mapping can include compatible features between a format for the second query engine and a format for the cloud storage table. Compatible features can include schema, data types, column identifiers, and/or table attributes controlling data layout, as examples. For example, the unifying runtime catalog 100 can use a mapping between formats for a data lake and a data warehouse to generate the table metadata as the type compatible with a data warehouse query engine 112 or a data lake query engine 110, regardless of whether the cloud storage table was generated in a format compatible with data lake query engines 110 or data warehouse query engines 112.

As shown in block 460, the unifying runtime catalog 100 can provide the table metadata of the table entries 106 to the second query engine to allow the second query engine to process the query. For example, the unifying runtime catalog 100 can respond to a request for table definitions with translated table definitions native to the second query engine, allowing for the second query engine to read the cloud storage table.

FIG. 5 depicts a flow diagram of an example process 500 for directing query processing when associated with governance policies. The example process 500 can be performed on a system of one or more processors in one or more locations, such as the example unifying runtime catalog 100 as depicted in FIG. 1. The unifying runtime catalog 100 can enable the governance policies 108 for query engines that do not support them by selecting table metadata, such as table definitions, based on whether the query engine supports the governance policies 108. The table metadata can direct the query engine to access data directly or to access data through a unifying runtime API 118. The unifying runtime catalog 100 can thus guarantee uniform enforcement of the governance policies 108 regardless of whether requests are from data lake query engines 110 or data warehouse query engines 112.

As shown in block 510, the unifying runtime catalog 100 can receive a request from a query engine to access data from a cloud storage table for a cloud storage system. The cloud storage table can correspond to a table for either the data lake storage 114 or data warehouse storage 116. The query engine can correspond to one of the data lake query engines 110 or one of the data warehouse query engines 112.

As shown in block 520, the unifying runtime catalog 100 can determine the cloud storage system is associated with one or more governance policies 108. Example governance policies 108 can include ACLs and/or FGACs, such as column security, data masking, row filtering, k-anonymity, or differential privacy. The unifying runtime catalog 100 can use the table entries 106 and governance policies 108 to determine which cloud storage systems are associated with which governance policies 108, if any.

As shown in block 530, the unifying runtime catalog 100 can determine whether the query engine supports the one or more governance policies 108 associated with the cloud storage system. The unifying runtime catalog 100 can store a mapping of which engines support which governance policies 108 to determine whether the query engine supports the one or more governance policies 108. For example, data warehouse query engines 112 and some data lake query engines 110 may not support FGACs while other data lake query engines 110 may support FGACs.

If the query engine supports the one or more governance policies 108, as shown in block 540, the unifying runtime catalog 100 can instruct the query engine to retrieve the data directly from the cloud storage table of the cloud storage system. If the query engine does not support one or more of the governance policies 108, as shown in block 550, the unifying runtime catalog 100 can instruct the query engine to retrieve the data from the cloud storage table through the unifying runtime API 118.

FIG. 6 depicts a flow diagram of an example process 600 for managing updates to cloud storage tables when associated with governance policies. The example process 600 can be performed on a system of one or more processors in one or more locations, such as the example unifying runtime catalog 100 as depicted in FIG. 1. The unifying runtime catalog 100 can manage updates from query engines so that any updates do not impact the one or more governance policies 108. The unifying runtime catalog 100 may only commit changes that do not affect the one or more governance policies 108 while rejecting changes that may affect the one or more governance policies 108. For example, a data lake query engine 110 not aware of a row access policy could attempt to rename a column referred to in the row access policy. Renaming the column could inadvertently expose data by causing the row access policy to no longer work. The unifying runtime catalog 100 can validate updates to ensure the updates do not affect the one or more governance policies 108.

As shown in block 610, the unifying runtime catalog 100 can receive a request from a query engine to update a cloud storage table for a cloud storage system. The cloud storage table can correspond to a table for either the data lake storage 114 or data warehouse storage 116. The query engine can correspond to one of the data lake query engines 110 or one of the data warehouse query engines 112.

As shown in block 620, the unifying runtime catalog 100 can determine the cloud storage system is associated with one or more governance policies 108. The unifying runtime catalog 100 can use the table entries 106 and governance policies 108 to determine which cloud storage systems are associated with which governance policies 108, if any.

As shown in block 630, the unifying runtime catalog 100 can determine whether the update to the cloud storage table affects the one or more governance policies 108. The unifying runtime catalog 100 can include logic to validate whether the update to the cloud storage table would adversely affect one or more of the governance policies 108 bound to the cloud storage table. For example, the logic can validate that each column deleted must not be referenced in one or more of the governance policies 108 bound to the cloud storage table. As another example, the logic can validate that an old name and a new name for a column rename must not be referenced in one or more of the governance policies 108 bound to the cloud storage table.

If the update does not affect the one or more governance policies 108, as shown in block 640, the unifying runtime catalog 100 can validate the update. If the update does affect the one or more governance policies 108, as shown in block 650, the unifying runtime catalog 100 can reject the update.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

The phrase "configured to" is used in different contexts related to computer systems, hardware, or part of a computer program. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for processing queries, comprising:
receiving, by one or more processors, a request from a query engine to access data from a cloud storage table residing in a cloud storage system;
identifying, by the one or more processors, a format of the query engine and a format of the cloud storage table from a cloud storage table inventory;
determining, by the one or more processors, that the format of the query engine and the format of the cloud storage table are incompatible based on a data storage type associated with the format of the query engine and a data storage type associated with the format of the cloud storage table;
based on determining that the format of the query engine and the format of the cloud storage table are incompatible, representing, by the one or more processors, table metadata of the cloud storage table in the format of the query engine using a bi-directional translation layer comprising a mapping that directly converts, during runtime, the format of the cloud storage table to the format of the query engine; and
providing, by the one or more processors, the table metadata represented in the format of the query engine to the query engine for the query engine to access the data.

2. The method of claim 1, further comprising:
receiving, by the one or more processors, a request from a second query engine to generate the cloud storage table; and
generating, by the one or more processors, the cloud storage table in a format compatible with the second query engine.

3. The method of claim 1, wherein the query engine is formatted for a data lake and the cloud storage table is formatted for a data warehouse or the query engine is formatted for a data warehouse and the cloud storage table is formatted for a data lake.

4. The method of claim 1, wherein the mapping comprises a mapping of compatible features between the format for the query engine and the format for the cloud storage table.

5. The method of claim 1, further comprising determining, by the one or more processors, that the cloud storage system is associated with one or more governance policies.

6. The method of claim 5, further comprising:
determining, by the one or more processors, that the query engine supports the one or more governance policies; and
retrieving, by the one or more processors, the data directly from the cloud storage table.

7. The method of claim 5, further comprising:
determining, by the one or more processors, that the query engine does not support the one or more governance policies; and
retrieving, by the one or more processors, the data from the cloud storage table through a unifying runtime application programming interface (API).

8. The method of claim 5, further comprising:
determining, by the one or more processors, that an update to the cloud storage table does not affect the one or more governance policies; and
validating, by the one or more processors, the update to the cloud storage table.

9. The method of claim 5, further comprising:
determining, by the one or more processors, that an update to the cloud storage table affects the one or more governance policies; and
rejecting, by the one or more processors, the update to the cloud storage table.

10. The method of claim 1, further comprising storing, by the one or more processors, file-level metadata in a metadata management system.

11. The method of claim 1, further comprising storing, by the one or more processors, lineage for the data from the cloud storage table.

12. The method of claim 1, further comprising supporting, by the one or more processors, unstructured data assets through object tables.

13. A system comprising:
one or more processors; and
one or more storage devices coupled to the one or more processors and storing instructions that, when executed by the one or more processors, cause the one or more processors to perform operations for processing queries, the operations comprising:
receiving a request from a query engine to access data from a cloud storage table residing in a cloud storage system;
identifying a format of the query engine and a format of the cloud storage table from a cloud storage table inventory;
determining that the format of the query engine and the format of the cloud storage table are incompatible based on a data storage type associated with the format of the query engine and a data storage type associated with the format of the cloud storage table;
based on determining that the format of the query engine and the format of the cloud storage table are incompatible, representing table metadata of the cloud storage table in the format of the query engine using bi-directional translation layer comprising a mapping that directly converts, during runtime, the format of the cloud storage table to the format of the query engine; and providing the table metadata represented in the format of the query engine to the query engine for the query engine to access the data.

14. The system of claim 13, wherein the operations further comprise:

receiving a request from a second query engine to generate the cloud storage table; and generating the cloud storage table in a format compatible with the second query engine.

15. The system of claim 13, wherein the query engine is formatted for a data lake and the cloud storage table is formatted for a data warehouse or the query engine is formatted for a data warehouse and the cloud storage table is formatted for a data lake.

16. The system of claim 13, wherein the mapping comprises a mapping of compatible features between the format for the query engine and the format for the cloud storage table.

17. The system of claim 13, wherein the operations further comprise determining that the cloud storage system is associated with one or more governance policies.

18. The system of claim 17, wherein the operations further comprise:

determining that the query engine supports the one or more governance policies and retrieving the data directly from the cloud storage table; or determining that the query engine does not support the one or more governance policies and retrieving the data from the cloud storage table through a unifying runtime application programming interface (API).

19. The system of claim 17, wherein the operations further comprise:

determining that an update to the cloud storage table does not affect the one or more governance policies and validating the update to the cloud storage table; or determining that an update to the cloud storage table affects the one or more governance policies and rejecting the update to the cloud storage table.

20. A non-transitory computer readable medium for storing instructions that, when executed by one or more processors, cause the one or more processors to perform operations for processing queries, the operations comprising:

receiving a request from a query engine to access data from a cloud storage table residing in a cloud storage system;

identifying a format of the query engine and a format of the cloud storage table from a cloud storage table;

determining that the format of the query engine and the format of the cloud storage table are incompatible based on a data storage type associated with the format of the query engine and a data storage type associated with the format of the cloud storage table;

based on determining that the format of the query engine and the format of the cloud storage table are incompatible, representing table metadata of the cloud storage table in the format of the query engine using a bi-directional translation layer comprising a mapping that directly converts, during runtime, the format of the cloud storage table to the format of the query engine; and providing the table metadata represented in the format of the query engine to the query engine for the query engine to access the data.

* * * * *